United States Patent
Kristensen et al.

(10) Patent No.: US 11,573,129 B2
(45) Date of Patent: Feb. 7, 2023

(54) INTELLIGENT MEAT THERMOMETER

(71) Applicant: COOKPERFECT APS, Støvring (DK)

(72) Inventors: Kasper Kristensen, Skørping (DK); Martin Kloster, Skørping (DK)

(73) Assignee: COOKPERFECT APS, Støvring (DK)

( * ) Notice: Subject to any disclaimer, the term of this patent is extended or adjusted under 35 U.S.C. 154(b) by 405 days.

(21) Appl. No.: 16/646,856

(22) PCT Filed: Aug. 27, 2018

(86) PCT No.: PCT/DK2018/050208
§ 371 (c)(1),
(2) Date: Mar. 12, 2020

(87) PCT Pub. No.: WO2019/052613
PCT Pub. Date: Mar. 21, 2019

(65) Prior Publication Data
US 2021/0010870 A1    Jan. 14, 2021

(30) Foreign Application Priority Data

Sep. 12, 2017 (DK) ............................ PA 2017 70680
May 22, 2018 (DK) ............................ PA 2018 00226

(51) Int. Cl.
*G01K 1/02* (2021.01)
*G01K 1/024* (2021.01)
*G01K 7/42* (2006.01)

(52) U.S. Cl.
CPC ............. *G01K 1/026* (2013.01); *G01K 1/024* (2013.01); *A47J 2202/00* (2013.01);
(Continued)

(58) Field of Classification Search
CPC ........ G01K 1/026; G01K 1/024; G01K 7/427; G01K 2207/02; G01K 2207/06; A47J 2202/00

See application file for complete search history.

(56) References Cited

U.S. PATENT DOCUMENTS 3,866,472 A * 2/1975 Witt .................... A47J 37/1266
374/102
3,931,620 A * 1/1976 Wellman, Jr. ............. F24C 7/08
327/449
(Continued)

FOREIGN PATENT DOCUMENTS

DE          235 327 A1    4/1986
DE  10 2004 047 756 A1    4/2006
(Continued)

OTHER PUBLICATIONS

First Office Action (eight pages) dated Jun. 11, 2018 from corresponding Danish Patent Application No. PA 2018 00226.
(Continued)

*Primary Examiner* — Nathaniel T Woodward
*Assistant Examiner* — Philip L Cotey
(74) *Attorney, Agent, or Firm* — Crowell & Moring LLP; John C. Freeman (57) ABSTRACT

An intelligent meat thermometer with the possibility of performing temperature measurements at three or more points in the meat, where at least one is measured on the far side of the center of the meat opposite the point of insertion, so that the center is between two points of measurement after insertion, so that the center temperature can be estimated, the meat thermometer, furthermore, being designed to be cheap to manufacture, and it can include an external unit for doing calculations, possibly via wireless connection, on received measurement data, and displaying of these calculations, and setting of parameters for use with the calculations.

12 Claims, 6 Drawing Sheets

(52) U.S. Cl.
CPC ......... *G01K 7/427* (2013.01); *G01K 2207/02* (2013.01); *G01K 2207/06* (2013.01)

(56) References Cited

U.S. PATENT DOCUMENTS

| | | | | |
|---|---|---|---|---|
| 3,952,597 | A * | 4/1976 | Witonsky | G01K 5/50 374/E1.002 |
| 8,556,502 | B2 * | 10/2013 | Austen | G01K 1/026 374/110 |
| 8,557,317 | B2 * | 10/2013 | Sonnendorfer | F24C 7/08 426/523 |
| 8,931,400 | B1 * | 1/2015 | Allen | A47J 36/00 99/344 |
| 2003/0007544 | A1 * | 1/2003 | Chang | F24C 7/08 374/149 |
| 2004/0146088 | A1 * | 7/2004 | Parra | G01K 1/14 374/E1.018 |
| 2004/0165647 | A1 * | 8/2004 | Singh | G01K 1/146 374/208 |
| 2004/0264545 | A1 * | 12/2004 | Rund | G01K 1/12 374/208 |
| 2006/0027567 | A1 * | 2/2006 | Biscotti | G05D 23/1931 374/E1.018 |
| 2006/0222051 | A1 * | 10/2006 | Rund | G01K 1/16 374/208 |
| 2008/0043809 | A1 * | 2/2008 | Herbert | G01K 1/026 374/E1.005 |
| 2008/0259995 | A1 * | 10/2008 | Kuhn | G01K 7/32 374/E1.004 |
| 2012/0224604 | A1 * | 9/2012 | Sonnendorfer | F24C 7/08 374/163 |
| 2012/0225170 | A1 * | 9/2012 | Sonnendorfer | F24C 7/08 116/216 |
| 2014/0341254 | A1 * | 11/2014 | Mendez | G01K 1/026 374/137 |
| 2015/0290795 | A1 * | 10/2015 | Oleynik | B25J 9/0081 700/257 |
| 2016/0051078 | A1 * | 2/2016 | Jenkins | H05B 6/1209 99/341 |
| 2017/0150841 | A1 * | 6/2017 | Johncock | G05B 15/02 |
| 2017/0248474 | A1 * | 8/2017 | Nielsen | G01K 1/024 |
| 2018/0120167 | A1 * | 5/2018 | Hammer | G01K 1/026 |
| 2020/0096393 | A1 * | 3/2020 | Lion | G01K 1/12 |

FOREIGN PATENT DOCUMENTS

| | | |
|---|---|---|
| DE | 10 2006 048 753 A1 | 4/2008 |
| EP | 1 757 862 A2 | 2/2007 |
| EP | 2 026 632 A2 | 2/2009 |
| EP | 2 136 604 A1 | 12/2009 |
| EP | 2 741 061 A1 | 6/2014 |
| WO | WO 2006/035005 A1 | 4/2006 |
| WO | WO 2014/185961 A1 | 11/2014 |
| WO | WO 2016/058616 A1 | 4/2016 |

OTHER PUBLICATIONS

International Search Report dated Oct. 12, 2018 from corresponding PCT Application PCT/DK2018/050208 (two pages).
Written Opinion dated Oct. 12, 2018 from corresponding PCT Application PCT/DK2018/050208 (ten pages).

* cited by examiner

INTELLIGENT MEAT THERMOMETER

This application is a National Stage application of International Application No. PCT/DK2018/050208, filed Aug. 27, 2018, the entire contents of which are incorporated herein by reference.

This application claims priority under 35 U.S.C. § 119(a) to 1) Danish Patent Application No. PA 2017 70680, filed on Sep. 12, 2017 and 2) Danish Patent Application No. PA 2018 00226, filed on May 22, 2018, the entire contents of each of which are incorporated herein by reference.

BACKGROUND OF THE INVENTION

Field of the Invention

The present invention relates to an intelligent meat thermometer that is designed to measure the temperature at three or more points in the meat by at least one temperature sensor at each point so as to estimate the center temperature of the meat.

The present invention relates to an intelligent meat thermometer that is designed to measure the temperature at three or more separate points in meat. It includes a probe with at least three sensors, the said probe being a stainless steel tube, and the sensors are located on the inner side of the steel tube in the longitudinal direction.

If at least one temperature is measured on the far side of the center of the meat opposite the point of insertion, so that the center is between two measurements, it will be possible to estimate the center temperature of the meat with the meat thermometer.

The measured temperatures are sent to an external unit for showing on a display or another external unit via cable or wirelessly.

The internal or external unit is designed to perform a calculation with received measurement data together with displaying of for instance the center temperature, possibly as a function of time, and can also be designed to setting of parameters for use at the calculations, so that any remaining cooking time can be estimated.

Description of the Related Art

The state of the art is described in EP2741061 A1, in which a meat thermometer and a method for determining the center temperature of the meat are described. The meat thermometer includes a probe with at least three temperature sensors for measurement at at least three points in the meat. If at least one temperature sensor, after insertion, is on the far side of the center of the meat opposite the point of insertion, so that the center is located at a point between the two temperature sensors, it is not necessary with extrapolation from an estimated polynomial as the closest descriptive mathematical function. In the Figures, parabolas are shown. The at least three measurement values, one from each of the at least three sensors, is used to find a lowest value by interpolation. This lowest value is the center temperature. According to the document, it is also possible to find polynomials of lowest order, so called Lagrange polynomials, from which the center temperature can be estimated. It is also stated that Newtonian algorithms can be used. The meat thermometer can also include a unit for calculating of received data.

The probe is described in such a way that it can be a steel tube, within which the sensors can be distributed evenly in the longitudinal direction. In FIG. 1 in the document, a conductor from the sensors and back to the top of the probe is shown. Measurement inaccuracies of the meat thermometer and means in the construction to minimize sources of erroneous readings are not mentioned.

Another meat thermometer is described in WO2006035005 and DE102004047756. The probe consists of a stainless steel tube with a diameter that is chosen to be so small that heat conduction along the walls of the probe is minimized. A number of sensors are located inside the probe, and each sensor has an energy saving unit manufactured in quartz to collect vibrational energy.

It is essential to ensure the correct center temperature of meat for the culinary quality and hygiene, and tests have shown that down to a centimeter from the center of the meat, the temperature can be up to 10° C. higher when cooking at oven temperatures of above 160° C. Furthermore, tests have shown that the variety of the center temperature of the meat is generally quite large (>20° C.) when cooking, which results in a very variant culinary quality. It is yet another problem that the meat shrinks with higher center temperature. Finally, it can constitute a hygienic problem, if the enter temperature is too low.

Therefore, it would be optimal to be able to estimate the center temperature as well as possible, without it leading too large costs of manufacturing the probe for measurement of the center temperature.

It is an object of the present invention to devise an intelligent meat thermometer that estimates the center temperature with higher accuracy than meat thermometers according to the state of the art, when, at the same time, the meat thermometer is cheap to manufacture.

SHORT DESCRIPTION OF THE INVENTION

The object of the present invention is met by an intelligent meat thermometer wherein the probe includes a tube of a stainless, heat conducting material such as steel, the said heat conducting material having a material thickness of between 0.05 and 0.30 mm, preferably between 0.05 mm and 0.25 mm and most preferably 0.25 mm, and that the probe is also designed with a distance between the temperature sensors in the steel tube, of less than 15 mm and preferably less than 10 mm at a material thickness of 0.05 mm, and with a distance of between 15 mm and 20 mm at a material thickness of between 0.05 and 0.25 mm, and with a distance of more than 20 mm at a material thickness of 0.25 mm and above.

A meat thermometer will not give rise to inaccurate measurements.

BRIEF DESCRIPTION OF THE DRAWINGS

In the following, the present invention will be described in further detail referring to the drawings, in which:

FIG. 4 shows a screen dump of an app for controlling roasting using a meat thermometer according to the invention, while

DESCRIPTION OF THE PREFERRED EMBODIMENT(S) OF THE INVENTION

App is short for an application or program that is downloaded to a smartphone or a tablet.

Figure 1:
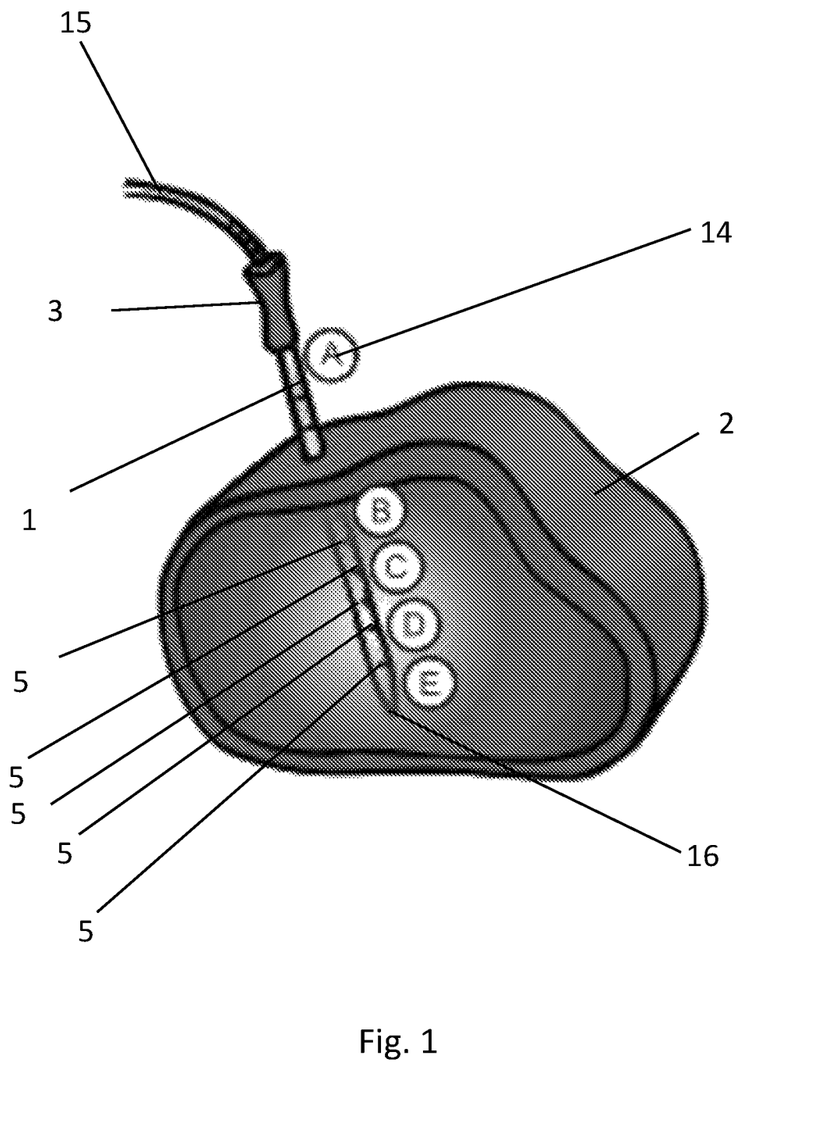
FIG. 1 shows a meat thermometer according to the invention.
Figure 2:
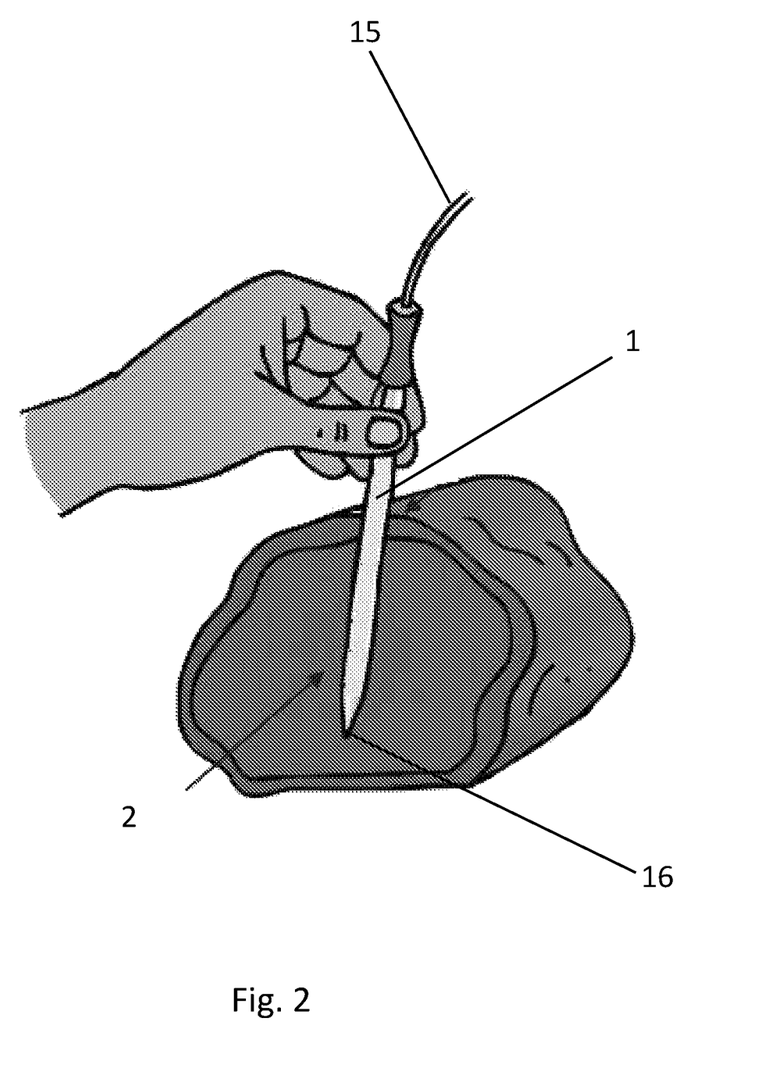
FIG. 2 shows insertion of a meat thermometer.
Figure 3:
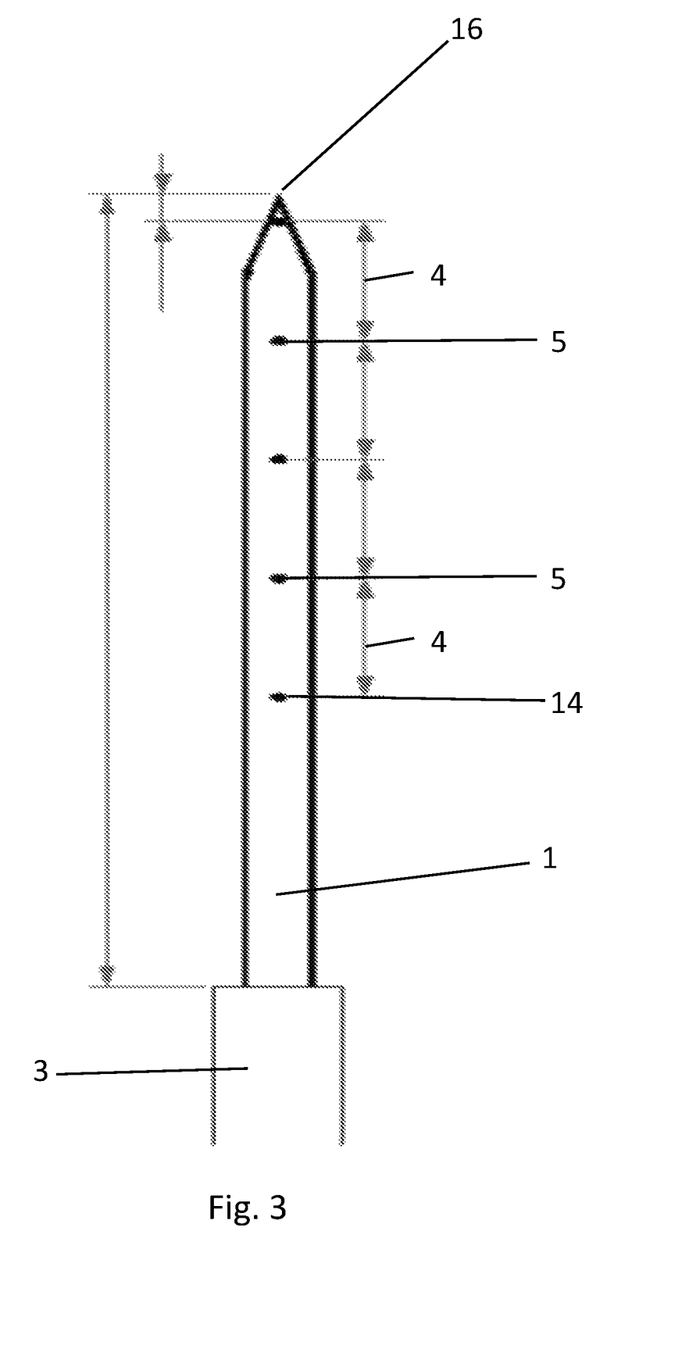
FIG. 3 shows a sectional view of a meat thermometer according to the invention.

FIGS. 1, 2 and 3 show an example of a meat thermometer according to the present invention for measuring the temperature of a piece of meat. It includes—a probe 1 for inserting into a piece of meat 2. There is a handle 3 that is manufactured in a heat insulating material and is connected by a cord 15 or wirelessly (not shown) to a calculator or unit that is adapted to receive collected measurement data, calculate, set and show settings and measurement results, whether these are calculated or read directly.

The probe 1 of the meat thermometer is adapted to be inserted longer than to the center of meat 2 that is roasting or is to be roasted on a grill, in an oven or in a casserole or is to be heat treated in any other way. The probe 1 is manufactured as a tube that is pointed and reinforced at the end 16 (FIG. 2) that is to be inserted into the meat 2. The tube 1 is manufactured in a thin walled stainless steel material (see FIG. 3) so as to obtain least possible heat conduction, but at the same time ensure a fairly accurate temperature measurement at the sensors 5 and 14 that are placed with equal spacing 4 in the steel tube 1.

The probe 1 of the meat thermometer could also include a transmitter for wireless communication (not shown) with a custom designed proprietary external unit or an app on an external unit, such as a smartphone or a tablet or any other device capable of receiving, processing and displaying processed and measured data, etc.

The unit can be a proprietary part of the thermometer or an app that is installed on a smartphone, a tablet or other similar devices for showing real temperature, calculate and show center temperature, show estimated remaining cooking time 8 calculated from the measured or calculated data for center temperature 7 and heat gradient that can be measured, calculated or chosen as an empirical value that only depends on the type and age of the meat.

The probe 1 on the meat thermometer according to the invention is provided with a number of at least three and advantageously four or more sensors 5, 14, at least three of which are intended to measure the temperature inside the meat 2. The sensors 5 can advantageously be of the thermistor or the thermocouple type. The sensors 5 are in direct contact with the inside of the steel tube of the probe 1 so as to obtain the best and most reliable measurement at each sensor 5, 14.

The embodiment of the meat thermometer of FIG. 1 has a probe 1 that includes five sensors 5 and 14, one A 14 for measuring the temperature outside the meat 2, and four B, C, D and E 5 for measuring temperatures at several positions through the meat.

It has been demonstrated experimentally that when measuring of at least three and advantageously more separate points in a solid piece of meat 2, at least one of the points being on the far side of the center of the meat 2 in relation to the point of insertion (see FIG. 1), it is possible to deduct a temperature curve through the meat 2, from which the coldest point in the meat 2, the center temperature, is estimated. In this way, the meat thermometer can be placed easily and comfortably and the desired result is insured every time.

At the same time, the meat thermometer is cheap to manufacture. It has shown that it is important to use for instance a stainless steel tube 1 with as little material thickness as possible, so that the heat resistance is as high as possible. The reason is that heat conduction from the heat conducting material at an adjacent sensor causes an erroneous reading due to heat transmitted from another place in the meat via heating of the tube of the probe 1. All things being equal, a small material thickness will therefore mean that only the temperature of the meat around the sensor concerned is measured with no or only a minimal erroneous reading.

Tests have shown that with a material thickness of the stainless steel tube of 0.25 mm, a distance between the sensors 5 of 20 mm or more reduces the heat effect of the sensors 5 from the surrounding heat source to a minimal level that will be negligible, while, at the same time, the control of the cooking temperature of the meat 2 is still fairly accurate. Consequently, a heat source at an adjacent sensor cannot give rise to an erroneous reading.

If one wants to further reduce the material thickness of the probe 1, so that the heat resistance is further increased, high requirements are put on the manufacturing process of the probe 1, and 0.25 mm has shown to be a good compromise.

However, tests have shown that by a material thickness of 0.05 mm, the distance between the sensors 5 can be reduced to below 15 mm, with the precision and the measurement accuracy still being fairly good. If the distance is reduced below 10 mm, the measurement accuracy becomes too bad.

When the tube of the probe is provided with the said material thicknesses and with the appertaining distances between the sensors 5, it is possible to manufacture the probe 1 very cheaply, as no other detailed manufacturing processes must be performed. At the same time, the probe 1 can be used to estimate the center temperature with high precision.

It is possible to do an estimate, as the measuring data that are results of the temperature measurements, advantageously, are used to determine a temperature curve and therefrom deduct the minimum temperature that is the centre temperature of the meat, by using a Lagrange polynomial or Newtonian algorithms.

In this way, it is possible to estimate the center temperature of the meat very precisely, whereby the drawbacks of insufficient precision of an estimated center temperature are largely avoided.

Tests have shown that the use of a Lagrange polynomial compared with other algorithms is optimal for calculation and deduction of the center temperature of the meat from this temperature curve, and hence calculate it very precisely. As stated, at least one measuring point must be located at the far side of the center of the meat 2.

With a design of the meat thermometer, as it is devised by this invention, a user will not be in doubt whether he has hit the center the meat, and in this way have had the opportunity to obtain an even very precise centre temperature measurement, whereby the basis for achieving the highest possible culinary quality is likely to be present.

When cooking a piece of meat, the meat is put on a heat source (directly or indirectly) so that the surrounding heat heats the cold piece of meat up, until it has reach the desired cooking temperature, followed by removal of the meat from the heat source.

The meat thermometer can comprise an external unit for calculating such as an app for use on smartphones or tablets, etc., or another similar unit that is capable of receiving input and perform calculations and display results therefrom. This provides the advantage that the integration of the mathematical calculations of the center temperature and cooking time in the app entails that the processor power in smartphones and tablets is used, whereby the manufacturing price of the electronics for the meat thermometer is reduced significantly.

Among further advantages of the present invention are:

When slow cooking, one wishes to keep all juices and flavour within the meat. This is done by keeping the oven or grill temperature low.

To ensure an optimal slow cooking, the temperature difference between the temperature and the surface of the meat must be as small as possible.

A useful technology must guarantee the measuring of the center temperature and the temperature difference through the meat so as to guarantee the correct slow cooking.

The present invention solves this problem, as the temperature difference through the meat is measured from the surrounding temperature that in the example of FIG. 1 is A (14), which in an oven is the oven temperature, and measurement data on temperatures from the sensors BCDE (5). The temperature difference, when cooking in an oven, can be adjusted to a preferred level by adjusting the oven temperature.

Another advantage of the present invention is that it is possible to calculate the cooking time. When one knows the center temperature of the meat, it is possible to calculate the remaining cooking time until the sought center temperature is achieved with the relevant surrounding temperature. It is also possible to display which surrounding temperature the oven or grill must be adjusted to at a given cooking time.

Especially when barbecuing, tests have shown that the accuracy of the calculated cooking time depends on the time expired. In the beginning of the barbecuing, the calculated cooking time is very inaccurate, but after approximately 5-7 minutes it is possible, within a couple of minutes, to calculate when the cooking is finished. Calculation of the cooking time becomes more and more precise with time. Calculation of the cooking time takes place continuously, so that changes in the surrounding temperature are taken into consideration.

Figure 4:
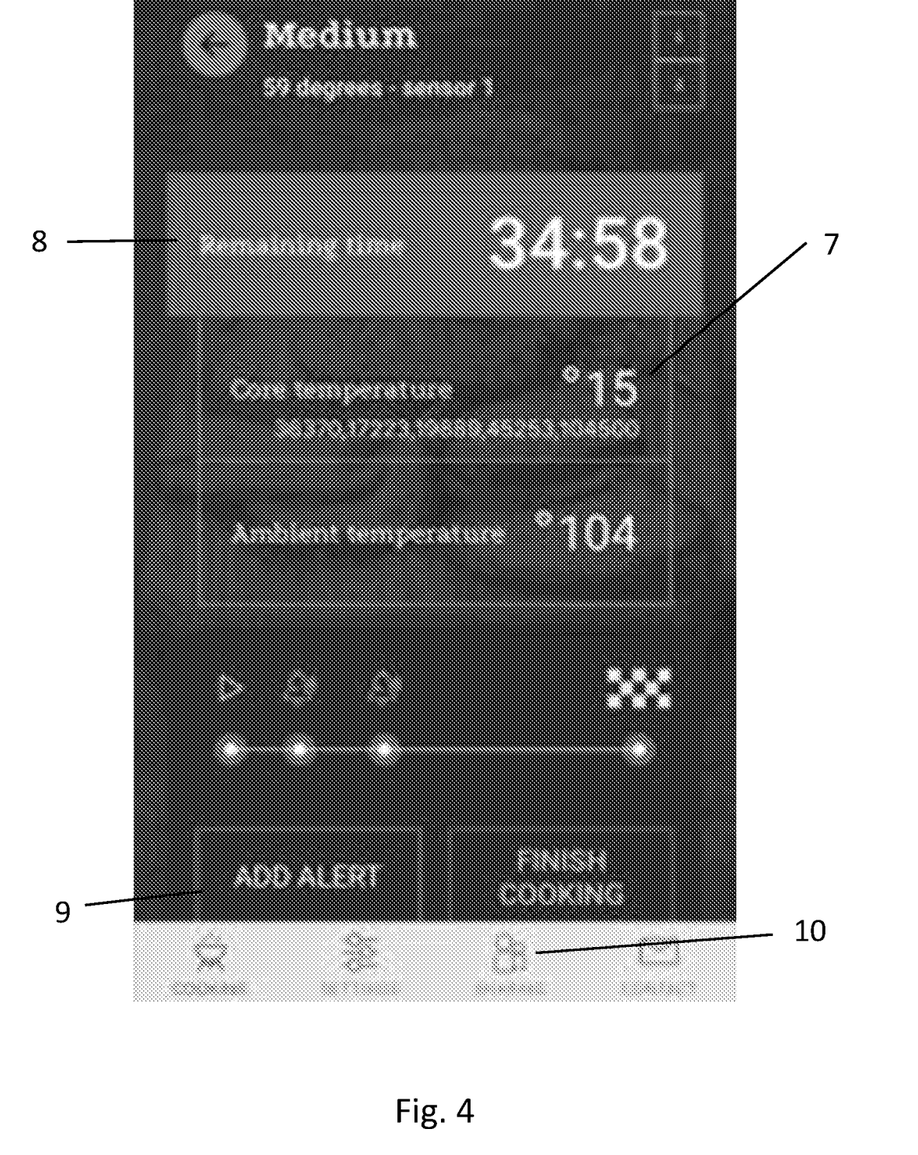
Figure 5:
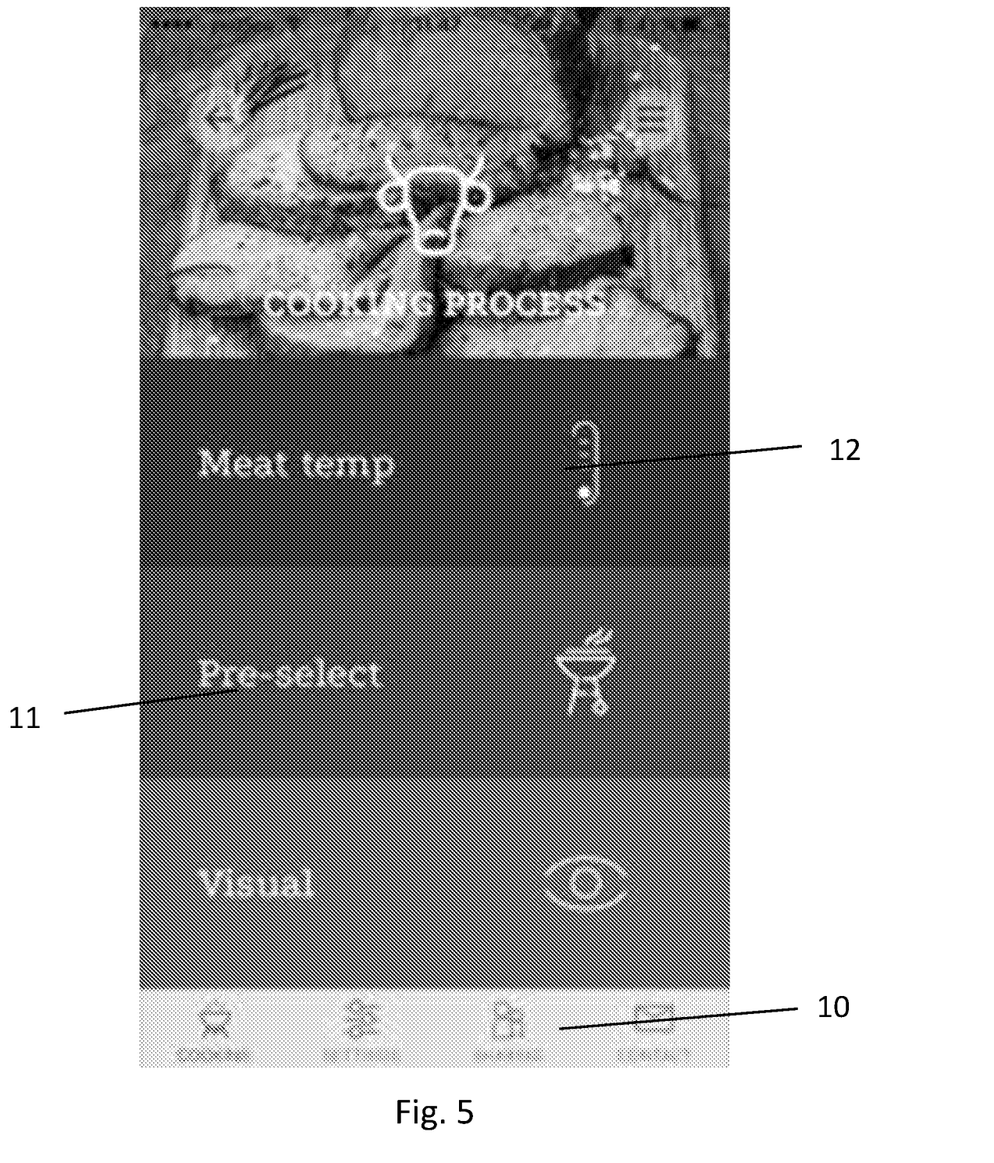
FIGS. 5 and 6 show other screen dumps of the app according to the invention.
Figure 6:
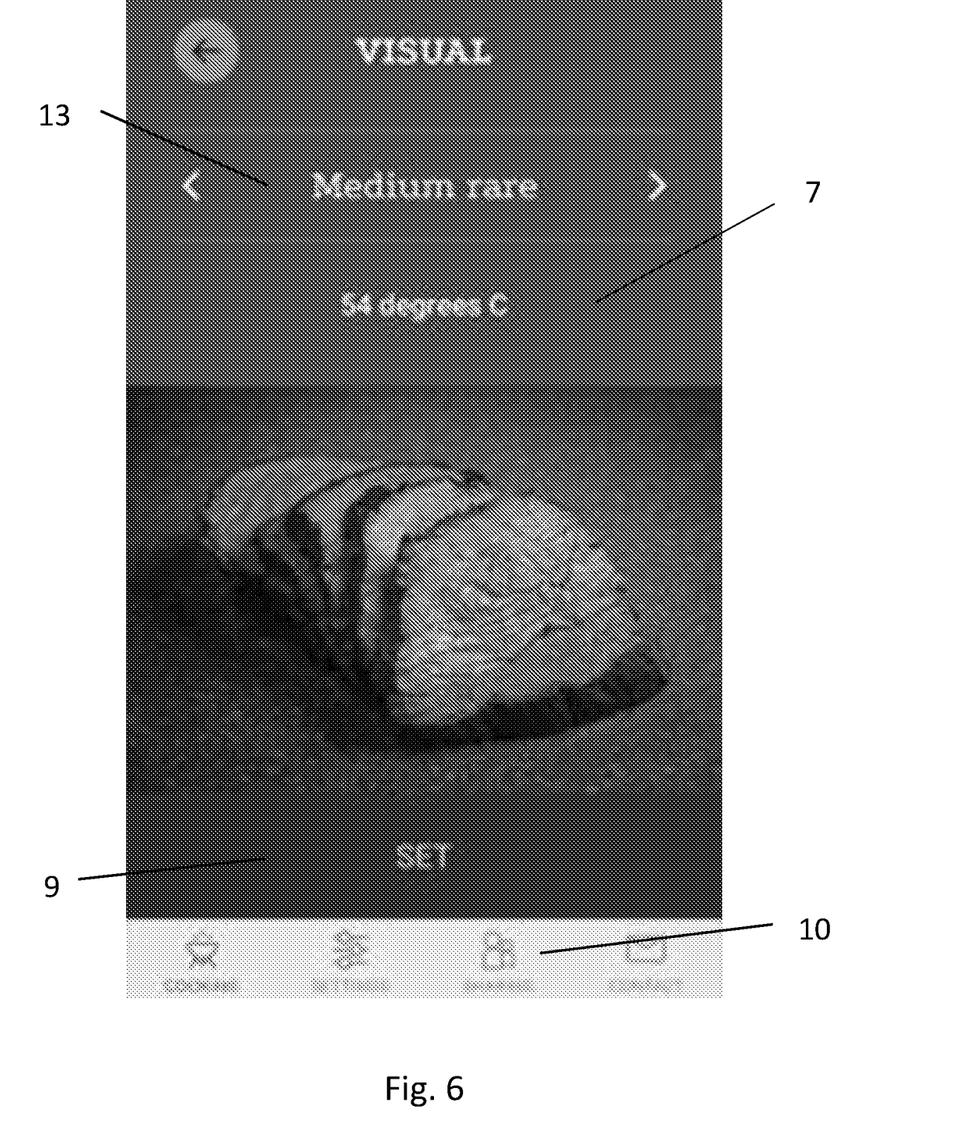

FIG. 4 shows an example of a wireless unit that can communicate with the intelligent meat thermometer. An app is shown that is installed on a smartphone or tablet. The principle can without further ado be transferred to any unit which is capable of communication—whether wirelessly or not—with the meat thermometer, and which, in this way, is capable of receiving measurement data, calculate, adjust and display settings and measurement results, whether these are calculated or read directly. The app that is shown in FIG. 4 to 6 is provided with a device for visualizing centre temperature 7, cooking time 8 and alarms through the whole cooking process.

The shown unit is designed with user friendliness in mind and includes, apart from the device for visualizing of center temperatures 7, etc., also a way for setting of alarms 9 and not least a way—for adjusting settings of the cooking process. For example, the app is provided with several possibilities for choosing cooking parameters, primarily center temperature. They can for example be reached by the possibilities that are shown in FIG. 5 for manually choosing the cooking process. Here, a setting of a cooking temperature can be performed by "Meat temp", which is a manual setting of the sought center temperature, but it is also possible to choose cooking process by choosing between shown "visuals" of meat that is cooked at different temperatures (se FIG. 6). When using the slide 13, it is possible to change between the five overall types of cooking of a piece of beef: the categories being—Rare, Medium Rare, Medium, Medium Done and Well Done.

When just browsing between these categories, the app shows pictures of the current category, so that one, by choosing, can decide for the wanted result on the background of a visual impression, whereby the app sets the necessary parameters and shows pictures of the current category at the same time.

It can also be contemplated that the present said invention can be integrated with a control for an oven or burner (barbecue) so that sought parameters can be controlled through all of the cooking period without manual adjustment of heat or cooking time. It can possibly be automatic control of an oven or burner (barbecue) so as to obtain the cooking of the meat defined by center temperature, cooking time and temperature difference through the meat, primarily during slow cooking.

The invention claimed is:

1. An intelligent meat thermometer comprising:
   a probe comprising:
      three temperature sensors for temperature measurement at least in three places in meat, where at least one of the three temperature sensors after insertion in the meat is on a far side of a center of the meat opposite a point of insertion, so that the center is located at a position between two of the three temperature sensors, whereby a center temperature of the meat can be estimated;
      a tube of a stainless, heat conducting material, the stainless, heat conducting material having a constant material thickness of from 0.05 mm to less than 0.30 mm, and that the probe comprises a structure such that: 1) with a distance between the three temperature sensors in the stainless, heat conducting material of less than 15 mm when the constant material thickness is 0.05 mm, 2) with a distance between the three temperature sensors in the stainless, heat conducting material of between 15 mm and 20 mm when the constant material thickness is between 0.05 mm and 0.25 mm, or 3) with a distance between the three temperature sensors in the stainless, heat conducting material of more than 20 mm when the constant material thickness is 0.25 mm to less than 0.30 mm, wherein the three temperature sensors are in direct contact with the tube; and
   a unit that is in communication with the three temperature sensors so as to receive measurement data from the three temperature sensors, the unit comprising a structure for calculating on basis of the measurement data, displaying results of calculations, and for setting of parameters for use in the calculations.

2. The intelligent meat thermometer according to claim 1, in which the calculations are performed using a Lagrange polynomial or Newtonian algorithms.

3. The intelligent meat thermometer according to claim 1, wherein the unit is an external unit that receives input about the measurement data of the three sensors and performs the calculations and displays the results of the calculations.

4. The intelligent meat thermometer according to claim 3, wherein the calculations of the center temperature and cooking time are integrated in the external unit.

5. The intelligent meat thermometer according to claim 3, wherein the external unit enables visual setting of a desired cooking temperature.

6. The intelligent meat thermometer according to claim 3, wherein the external unit is selected from the group consisting of a smartphone and a tablet.

7. The intelligent meat thermometer according to claim 1, wherein the probe comprises a transmitter for wireless transmission of measurement data.

8. The intelligent meat thermometer according to claim 1, wherein the measurement data that are derived from the temperature measurements and the calculations are also used for calculation of cooking time based on a calculation of development of the center temperature.

9. The intelligent meat thermometer according to claim 1, wherein the displaying results of calculations comprises displaying a remaining cooking time.

10. The intelligent meat thermometer according to claim 1, wherein the displaying results of calculations comprises displaying a center temperature.

11. The intelligent meat thermometer according to claim 10, in which the calculations are performed using a Lagrange polynomial or Newtonian algorithms.

12. The intelligent meat thermometer according to claim 1, wherein the stainless, heat conducting material is steel.

* * * * *